# 2,833,765

MELAMINE PROCESS

Carroll A. Hochwalt, Clayton, Mo., assignor to Monsanto Chemical Company, St. Louis, Mo., a corporation of Delaware No Drawing. Application August 15, 1956
Serial No. 604,070

3 Claims. (Cl. 260—249.7)

The present invention relates to the preparation of melamine.

It is an object of the invention to prepare melamine by reacting ammonia, hydrogen cyanide, and sulfur under conditions of superatmospheric pressure and at elevated temperatures. Additional objects and advantages will be apparent from the discussion hereinafter.

The following example illustrates the invention but is not to be construed as limiting it in any manner.

Example 1

To a 300-cc. rocker-type autoclave there was charged 44 g. of ammonium cyanide and 32 g. of sulfur. The ammonium cyanide had been previously prepared by passing gaseous ammonia over liquid hydrogen cyanide until the white solid ammonium cyanide was formed. The autoclave was sealed at room temperature and it was then heated for about 2¼ hr. under the autogenously developed pressure of 225 p. s. i. g. to a temperature of about 340° C. At the end of the reaction period, the autoclave was cooled and vented. The reaction product was dissolved in hot water (100° C.) and filtered while hot to remove the water-insoluble materials. Enough sodium hydroxide was added to the filtrate to make a 10% caustic solution. This solution was cooled in an ice bath whereby the melamine was crystallized. The melamine crystals were then separated and dried. The melamine product was identified both by infrared analysis and melting point. It melted at 347° C. as compared to 349° C. for an authentic sample of melamine and in a mixed melting point determination the melting point of the authentic melamine sample was 346° C.

It is to be understood that substantial variation may be made from the specific conditions set forth in the example without departing from the scope of the invention. For example, the ammonia and hydrogen cyanide would ordinarily be charged to the pressure reactor directly rather than as ammonium cyanide. The use of the salt was merely a convenience in the experiment given in the example since it is well established that it readily dissociates under the conditions of the reaction into ammonia and hydrogen cyanide. The proportions of reactants can be varied widely but it is preferred to have ammonia present in excess to prevent decomposition of the melamine. Any hydrogen cyanide-ammonia mole ratio from 1:20 to 20:1 respectively may be used although practical considerations make it preferable to maintain the mole ratio of hydrogen cyanide to ammonia in the range from 1:1 to 1:10. The quantity of sulfur to be used is best related to the quantity of hydrogen cyanide employed. Equimolecular quantities of these two reactants are satisfactory although slight excesses of sulfur are preferred. The sulfur may be employed in greater excess although too large an excess is to be avoided.

The temperature is not limited to 340° C. but may vary in the range from about 200° C. to about 450° C. with temperatures in the range from 300–350° being preferred. The pressure can also be varied considerably. It can be as low as 200 p. s. i. g. and as high as 2000 p. s. i. g. or even higher.

The reaction time required will vary with the temperature and can range from a few minutes to 8–10 hours or longer. At a temperature of about 300–350° C., the reaction is complete in approximately one hour, whereas at lower temperatures several hours are required.

Either batch or continuous processes are feasible. The product melamine may also be recovered from the reaction mass by various other means such as sublimation for example.

What is claimed is:

1. A method for the preparation of melamine which comprises heating together ammonia, hydrogen cyanide, and sulfur at a temperature in the range from 200 to 450° C. and a pressure in the range from 200 to 2000 p. s. i. g.

2. A method for the preparation of melamine which comprises heating together ammonia, hydrogen cyanide, and sulfur in a closed reaction zone at a temperature of about 340° C. and under autogenously developed pressure.

3. The method of claim 2 in which the mole ratio of ammonia:hydrogen cyanide:sulfur is 1:1:1.

References Cited in the file of this patent

UNITED STATES PATENTS

| 2,008,253 | Klempt | July 16, 1935 |
| 2,567,955 | Marsh | Sept. 18, 1951 |

FOREIGN PATENTS

| 729,140 | France | Dec. 31, 1931 |
| 559,171 | Germany | Aug. 17, 1932 |

OTHER REFERENCES

Chemical Abstracts, vol. 38, p. 6075 (1944). (Abstract of Klempt Gluckauf, vol. 79, pp. 520–522 (1943)).

Jacobson, Chemical Markets, vol. 29, p. 365 (1931).

Beilsteins' Handbuch der Organischen Chemie, vol. 26 (4th ed. 1937 printing), p. 245 (Preparations of malamine).